US009439500B2

(12) United States Patent
Smith

(10) Patent No.: US 9,439,500 B2
(45) Date of Patent: Sep. 13, 2016

(54) PACK ASSEMBLY AND INTEGRATED DOG LEASH

(71) Applicant: Yvonne C. Smith, Seattle, WA (US)

(72) Inventor: Yvonne C. Smith, Seattle, WA (US)

( * ) Notice: Subject to any disclaimer, the term of this patent is extended or adjusted under 35 U.S.C. 154(b) by 0 days.

(21) Appl. No.: 14/218,671

(22) Filed: Mar. 18, 2014

(65) Prior Publication Data

US 2015/0053734 A1    Feb. 26, 2015

Related U.S. Application Data

(60) Provisional application No. 61/802,089, filed on Mar. 15, 2013.

(51) Int. Cl.
*F41C 33/00* (2006.01)
*A45F 3/00* (2006.01)
*A45F 3/04* (2006.01)
*A45F 3/14* (2006.01)

(52) U.S. Cl.
CPC . *A45F 3/00* (2013.01); *A45F 3/04* (2013.01); *A45F 2003/001* (2013.01); *A45F 2003/146* (2013.01); *A45F 2200/055* (2013.01); *A45F 2200/0516* (2013.01); *A45F 2200/0558* (2013.01); *A45F 2200/0583* (2013.01)

(58) Field of Classification Search
CPC .... A45F 3/00; A45F 3/04; A45F 2200/0516; A45F 2200/0558; A45F 2200/0583; A45F 2003/146; A45F 2200/055; A45F 2003/001
See application file for complete search history.

(56) References Cited

U.S. PATENT DOCUMENTS

| 2,776,644 | A | * | 1/1957 | Fontaine | A01K 27/004 119/796 |
| 2,919,676 | A | * | 1/1960 | Schneider | A01K 27/004 119/796 |
| 3,937,418 | A | * | 2/1976 | Critelli | B65H 75/4431 119/796 |
| 4,466,124 | A | * | 8/1984 | Kirkham, Jr. | A45F 3/04 224/153 |
| 4,961,573 | A | * | 10/1990 | Wehrell | A63B 21/0552 482/124 |
| 5,012,964 | A | * | 5/1991 | Falletta | B63C 11/26 224/153 |
| 5,358,461 | A | * | 10/1994 | Bailey, Jr. | A63B 21/0053 290/1 R |
| 5,361,955 | A | * | 11/1994 | Gregory | A45F 3/04 224/630 |
| 5,377,626 | A | * | 1/1995 | Kilsby | A01K 27/004 119/796 |
| 5,618,249 | A | * | 4/1997 | Marshall | A63B 21/1403 482/115 |
| 5,630,536 | A | * | 5/1997 | Bugnaski | A45F 3/00 224/259 |
| 5,733,231 | A | * | 3/1998 | Corn | A63B 21/025 482/120 |
| 5,795,274 | A | * | 8/1998 | Kasbohm | A63B 21/015 482/115 |
| 5,826,771 | A | * | 10/1998 | Peng | A45F 3/04 224/645 |

(Continued)

*Primary Examiner* — Brian D Nash
(74) *Attorney, Agent, or Firm* — Perkins Coie LLP

(57) ABSTRACT

Pack assemblies for dog walking are disclosed herein. Such assemblies can include, for example, an upper portion and a lower portion. The upper portion can include a first strap and a second strap. The lower portion can include a leash assembly having a slider and a leash clip configured to be detachably coupled to a dog leash. In some embodiments, the leash clip can slide along the slider.

18 Claims, 19 Drawing Sheets

(56) References Cited

U.S. PATENT DOCUMENTS

| | | | | |
|---|---|---|---|---|
| 5,876,310 A * | 3/1999 | Mackey | | A63B 23/12 482/114 |
| 6,099,447 A * | 8/2000 | Ramsaroop | | A63B 21/1403 482/107 |
| 6,152,338 A * | 11/2000 | Smith | | A01K 97/10 224/149 |
| 6,792,893 B1 * | 9/2004 | Quintero | | A01K 27/004 119/794 |
| 6,845,736 B1 * | 1/2005 | Anderson | | B65H 75/4431 119/796 |
| 7,040,257 B2 * | 5/2006 | Waxman | | A01K 27/004 119/796 |
| 7,854,694 B1 * | 12/2010 | Frunzi | | A63B 21/0552 482/121 |
| 2002/0153402 A1 * | 10/2002 | Gausling | | A45F 3/047 224/643 |
| 2005/0077329 A1 * | 4/2005 | Sconzo | | A45F 3/04 224/153 |
| 2006/0208024 A1 * | 9/2006 | Gleason | | A45F 3/08 224/633 |
| 2007/0257072 A1 * | 11/2007 | Pena | | F41C 23/02 224/150 |
| 2009/0206118 A1 * | 8/2009 | Sabbah | | A45C 13/02 224/652 |
| 2010/0025441 A1 * | 2/2010 | Blaney | | A45F 5/02 224/148.6 |
| 2011/0094006 A1 * | 4/2011 | Cole | | A45F 5/00 2/102 |
| 2012/0037675 A1 * | 2/2012 | Shepherd | | A45C 3/00 224/259 |
| 2013/0043293 A1 * | 2/2013 | Connell | | A45F 3/04 224/652 |
| 2013/0047312 A1 * | 2/2013 | Wilson | | A45F 5/02 2/69 |
| 2013/0292432 A1 * | 11/2013 | Stevens | | A45F 3/04 224/184 |
| 2014/0001220 A1 * | 1/2014 | Brensinger | | A45F 3/04 224/637 |

* cited by examiner

PACK ASSEMBLY AND INTEGRATED DOG LEASH

CROSS-REFERENCE TO RELATED APPLICATION(S)

This application claims the benefit of currently pending U.S. Provisional Patent Application No. 61/802,089, filed Mar. 15, 2013, the disclosure of which is incorporated herein by reference in its entirety.

TECHNICAL FIELD

Embodiments of the present invention are directed to packs for activewear, and, more particularly to packs having an integrated dog leash.

BACKGROUND

Walking a dog, especially large dogs, can be physically demanding on the dog walker. When a dog pulls on the leash, the dog walker is often times pulled forward, with a majority of the pulling force on an upper portion of the body which may cause trauma to the arms, shoulder joints, and/or back of the dog walker, and in some cases may result in a fall, causing further injury. Moreover, walking a dog takes at least one hand, which only leaves one hand free. Last, walking a dog may be particularly dangerous in the woods or at night, as a dog walker may be prone to injury by cars or wild animals.

DETAILED DESCRIPTION

Specific details of several embodiments of the present technology are described herein with reference to FIGS. 1-16. Additionally, other embodiments of the present technology can have different configurations, components, or procedures than those described herein. For example, other embodiments can include additional elements and features beyond those described herein, or other embodiments may not include several of the elements and features shown and described herein. For ease of reference, throughout this disclosure identical reference numbers are used to identify similar or analogous components or features, but the use of the same reference number does not imply that the parts should be construed to be identical. Indeed, in many examples described herein, the identically-numbered parts are distinct in structure and/or function.

Figure 1A:
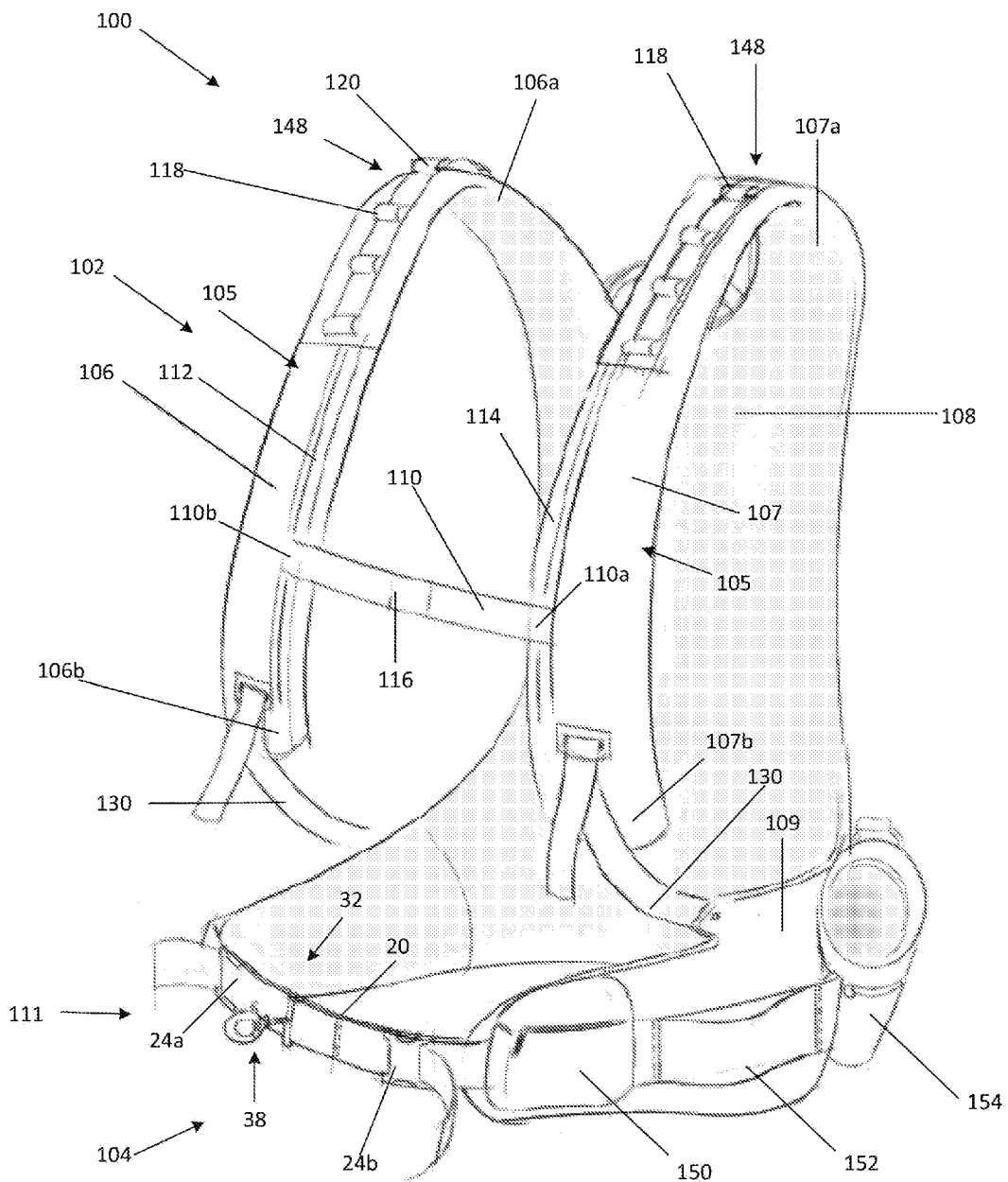
FIG. 1A is a front view of a pack assembly in accordance with an embodiment of the present technology.
Figure 1B:
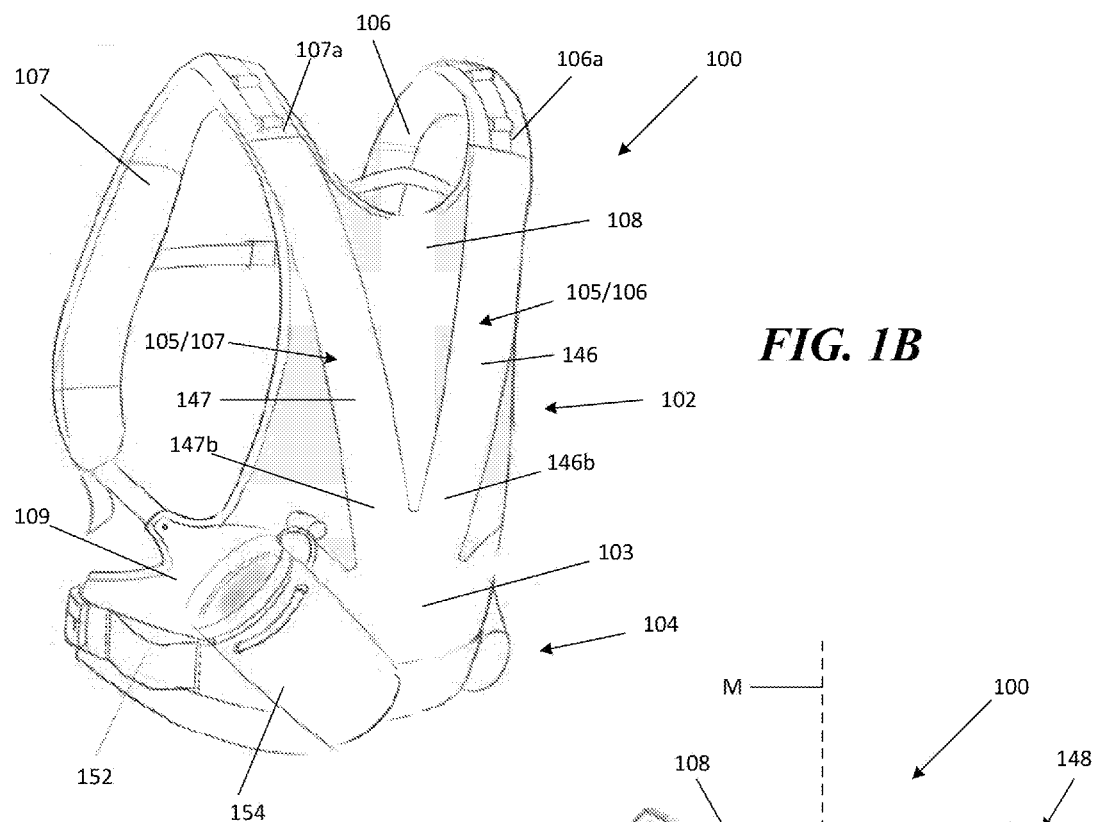
FIG. 1B is a rear perspective view of the pack assembly shown in FIG. 1A.
Figure 1C:
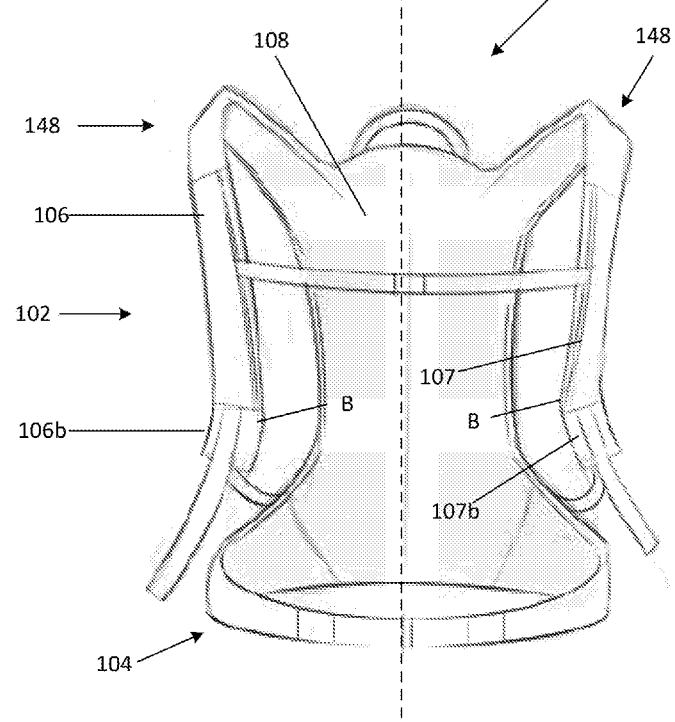
FIG. 1C is a front view of the pack assembly shown in FIG. 1A.

FIG. 1A is a front perspective view of a pack assembly 100 ("pack 100") configured in accordance with an embodiment of the present technology, and FIGS. 1B and 1C are rear perspective and front views, respectively, of the pack shown in FIG. 1A. Referring to FIGS. 1A-1C together, the pack 100 can include an upper portion 102 and a lower portion 104. The upper portion 102 can include one or more straps 105 and a rear member 108. As shown in FIG. 1A, the upper portion 102 can include a first strap 106 and a second strap 107. The first and second straps 106, 107 can generally define a front portion of the upper portion 102 when worn by the wearer.

The first and second straps 106, 107 can each have a first end 106a, 107a connected to the rear member 108 and a second end 106b, 107b coupled to the lower portion 104 (either directly (not shown) or via the adjusting element 130, discussed in greater detail below). The first and second ends 106a, 107a can connect to the rear member 108 at connection points that are separated along the rear member 108. Each strap 106, 107 can include a shoulder portion 148 that is configured to rest on the wearer's shoulders. The straps 105 can be configured to absorb pulling forces exerted on the lower portion 104 (such as the weight of a dog) so that such forces are distributed across the wearer's upper body rather than the wearer's waist alone. Additionally, the straps 105 can be curved so as to increase the comfort of the wearer, and also to provide better force distribution across the wearer's torso. For example, as best shown in FIG. 1C, the first and second straps 106, 107 can generally angle inwardly (i.e., toward a midline M of the pack 100) between the shoulder portion 148 and the corresponding second end 106b, 107b. In some embodiments, including that shown in FIGS. 1A-1C, the straps 106, 107 can also angle outwardly (after angling inwardly) such that each strap has a bend B along the length of the respective strap 105.

The second ends 137a, 137b of the each of the straps 106, 107 can be coupled to an adjusting element 130 that extends between each of the first and second straps 106, 107 and the lower portion 104. As such, the adjusting element 130 connects a front portion of each of the first and second straps 106, 107 to the lower portion 104 of the pack 100. The length of the adjusting element 130 can be adjusted by the wearer, thereby affecting the length of the straps 105. Accordingly, lengthening and shortening of one or more of the adjusting elements 130 can move the straps 105 and the lower portion 104 farther apart or closer together, respectively. In some embodiments (not shown), the pack 100 does not include adjusting elements 130 and the first and/or second straps 106, 107 directly connect to the lower portion 104.

In the embodiment shown in FIGS. 1A-1C, the pack 100 is shown having two straps 105. In other embodiments, the pack 100 can have one strap 105 configured to be worn diagonally across the body. Moreover, in particular embodiments, one or more of the straps 105 can include a webbing 118 having one or more attachment loops 120 for attaching various items. One or more of the straps 105 can optionally include reflective material (not shown). The reflective material can be woven and/or sewn into the fabric of the straps 105. In some embodiments, the reflective material can be detachably connected to the straps 105, such as by a removable adhesive or Velcro. In particular embodiments, the entirety of the straps 105 may be made from a reflective material, or in some embodiments, the reflective material may comprise just a periphery of the straps 105.

Referring still to FIGS. 1A-1C, the rear member 108 can comprise a rear portion of the pack 100. The rear member 108 can define the inner rear surface of the pack 100 that is configured to, when worn, be positioned adjacent the back of the wearer. The rear member 108 can be configured to cover a substantial portion of the wearer's back between the straps 105 and the lower portion 104, thereby absorbing and redistributing forces exerting on the first and second straps 106, 107. The rear member 108 can be contiguous with the lower portion 104 such that an inner portion of the lower portion 104 extends into the inner portion of the upper portion 102. In some embodiments, the rear member 108 can be made of a breathable material, such as a mesh. In other embodiments, the rear member 108 can be made of a flexible material, a webbed material, or have other suitable configurations.

The rear member 108 can further include one or more strap overlays 146, 147 (e.g., nylon, polyester, GOR-TEX®, etc.) positioned on an exterior portion of the rear member 108, facing away from the wearer. The strap overlays 146, 147 can have a first end 146a, 147a connected to the corresponding first ends 106a, 107a of the first and second straps 106, 107, respectively, and a second end 146b, 147b connected to the lower portion 104. The rear portions 146, 147 can angle towards one another from the first ends 146a, 147a to the second ends 146b, 147b such that the second ends 146b, 147b meet at the lower portion 104. As such the strap overlays 146, 147 can generally define a V-shape.

The upper portion 102 can optionally include a chest strap 110. As shown in FIG. 1A, the chest strap 110 can have a first end 110a coupled to a first runner 112 fixed to the first strap 106 and a second end 110b coupled to a second runner 114 fixed to the second strap 107. As such, the height of the chest strap 110 relative to the straps 106, 107 can be adjusted by sliding the chest strap 110 along the runners 112, 114. Additionally, the length or tension of the chest strap 110 may be adjusted by an adjustment means 116 (shown schematically in FIG. 1A). For example, adjustment of the chest strap 110 can pull the straps 105 together and/or release tension between the straps 105. As such, the chest strap 110 can redistribute pulling forces across the chest. The chest strap 110 can be made from a stretchable material, or in other embodiments, the chest strap 110 can comprise a non-stretchable, solid piece of fabric and/or a stretchable piece of fabric that is sewed or otherwise adhered to first strap and has a Velcro connection at the second strap.

Referring still to FIG. 1A, the lower portion 104 of the pack 100 can be generally circular and configured to be worn at or near a wearer's hips. The lower portion 104 can have a rear portion 103, two side portions 109, and a front portion 111. The rear portion 103 of the lower portion 104 can be contiguous with a bottom portion of the rear member 108. In some embodiments, the side portions 109 of the lower portion 104 can be coupled to the corresponding first and second straps 106, 107 (e.g., either directly or via a coupling means, such as the adjusting element 130). In other embodiments, one or more of the straps 105 can be coupled to the lower portion 104 at any location along the lower portion 104 (e.g., the front portion 111).

Figure 2:
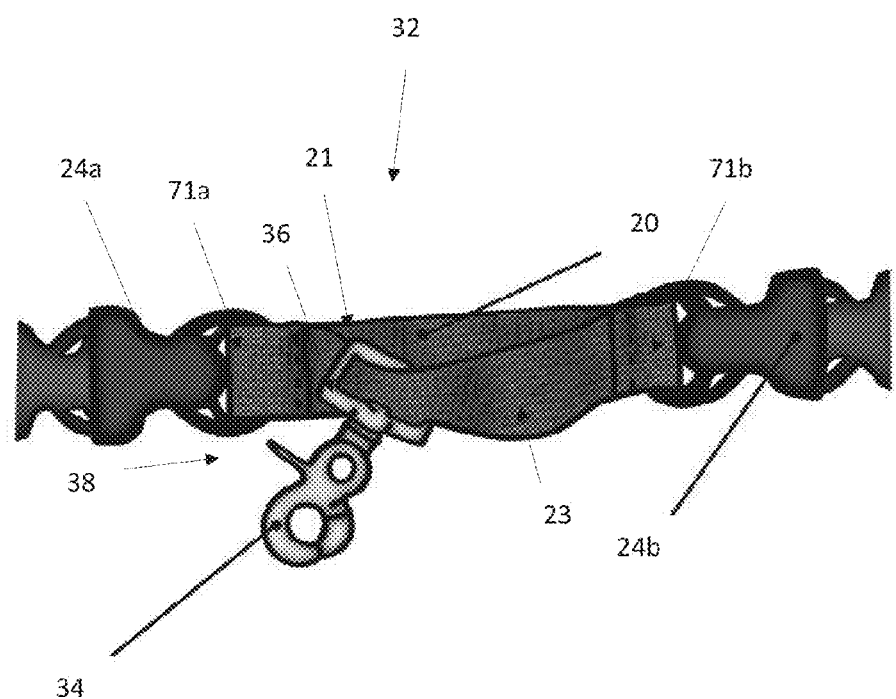
FIG. 2 is an enlarged, isolated view of the leash assembly of FIG. 1A configured in accordance with embodiments of the present technology.

The front portion 111 of the lower portion 104 can include a leash assembly 32. The leash assembly 32 can define all or a portion of the front portion 111. In other embodiments (not shown), the leash assembly 32 can be positioned anywhere along the lower portion 104. FIG. 2 is an enlarged, isolated view of the leash assembly 32 shown in FIGS. 1A-1C. As best shown in FIG. 2, the leash assembly 32 can include a first coupling 24a, a second coupling 24b, a guide 20 and a slider 38. The guide 20 can extend between the first coupling 24a and the second coupling 24b, and the slider 38 can be slidably coupled to the guide 20. In some embodiments, the guide 20 can be multilayered. For example, the guide 20 can include a first layer 21 and a second layer 23. The first layer 21 and the second layer 23 can coupled to one another at their respective ends (e.g., via the first and second couplings 24a, 24b). Although the slider 38 is shown coupled to the second layer 23 in FIGS. 1A-2, the slider 38 can additionally or alternatively be coupled to the first layer 21. In some embodiments, the slider 20 can comprise a single layer of material or can be more than two layers (e.g., one layer, three layers, etc.).

In some embodiments, one or more layers of the guide 20 can be made of an elastic material that allows the guide 20 to stretch and compress in response to forces exerted on the slider 38. Additionally, such flexibility allows the guide 20 to absorb some of the forces exerted on the pack 100 and prevent, or at the very least lessen, sudden, unexpected pulling forces on the wearer (e.g., that would cause a jolt to the wearer) and allow the wearer to respond. In other embodiments, one or more layers of the guide 20 can be made of a stiff material (e.g., a metal or non-elastic fabric) so as to not allow much stretch in the guide 20.

The leash assembly 32 can have a first end 71a and a second end 71b opposite the first end 71a. The first end 71a of the leash assembly 32 can be connected to the lower portion 104 via a first coupling 24a, and a second end 71b of the leash assembly 32 can be connected to the lower portion 104 via the second coupling 24b. The lower portion 104 can be uncoupled (i.e., detached along its length) by uncoupling the first coupling 24a, the second coupling 24b, or both. As such, the leash assembly 32 can be entirely removed from the pack 100 by uncoupling the first coupling 24a and the second coupling 24b from the lower portion 104. The leash assembly 32 can be reattached to the lower portion 104 by re-coupling the first and second couplings 24a, 24b to the lower portion 104.

The slider 38 can have a slideable portion 36 and a locking portion 24. The slideable portion 36 can be slideably coupled to the guide 20 and configured to slide along the length of the guide 20. The locking portion 24 can be coupled to a leash, such as a dog leash. It should be noted that the technology disclosed herein, although discussed in terms of dog leashes, is not limited to use with dog leashes and be used with any connecting device, such as leashes for any animal, children's leashes, etc. In some embodiments, the leash assembly 32 can include more than one guide 20 and/or more than one slider 38. When a wearer wears the pack and couples a leash to the locking portion 24, the dog has greater freedom of movement because the leash clip 28 can move laterally along the slider 20. Likewise, depending on the elasticity of the guide 20, the leash assembly 32 can also allow vertical movement of the slider 38.

Figure 3:
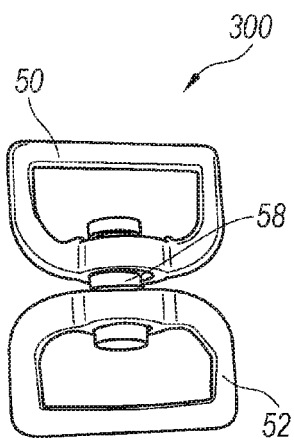
FIG. 3 is a front view of one embodiment of a leash clip configure in accordance with the present technology.
Figure 4:
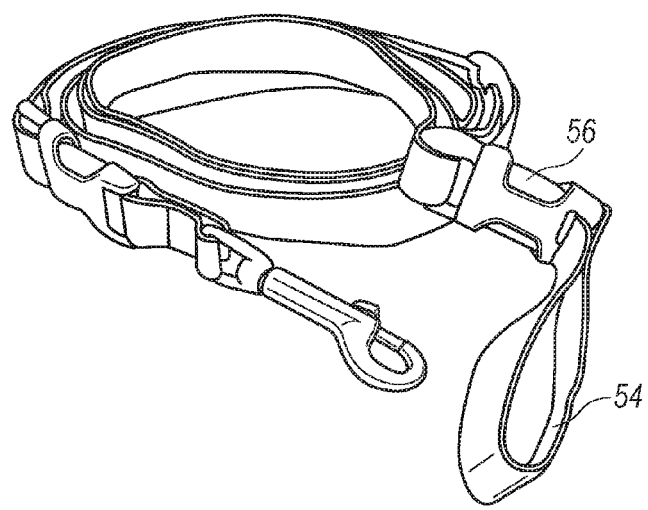
FIG. 4 is a perspective view of one embodiment of a leash to be used with the leash clip of FIG. 3A configured in accordance with the present technology.

FIG. 3 is another embodiment of a slider 300 that can be used with the leash assembly 32. The slider 300, for example, can be utilized when relatively large forces are possible at the other end of the leash (e.g., large dogs). The slider 300 can have a first slideable portion 50 and a second slideable portion 52. The first slideable portion 50 can be coupled to one or more layers of the guide 20. The second slideable portion 52, for example, can be coupled to a leash loop 54 (shown for illustrative purposes in FIG. 4; the leash loop 54 shown coupled by a leash coupling 56 to a dog leash). When a wearer walks a larger dog, the slider 300 facilitates a quicker release of the dog from the pack assembly 100. In the slider 300 or any other embodiments herein, the slider 300 can include a metal swivel 58 positioned between the slideable portions (or between the slideable portion and the locking portion) that allows rotation of the coupled portions.

Referring back to FIGS. 1A-1C, the lower portion 104 may further include one or more carrying elements, such as pockets 150, attachment loops 152, and water bottle carriers 154. The carrying elements may be any suitable size or shape. For example, in some embodiments, the pockets 150 can be configured to fit a smartphone (not shown). In these and other embodiments, the pockets 150 may be sized to fit a water bottle (not shown), a credit card (not shown), keys (not shown) and other objects that a wearer may want to carry. Furthermore, in some embodiments, the lower portion 104 does not include a pockets 150.

Figure 5A:
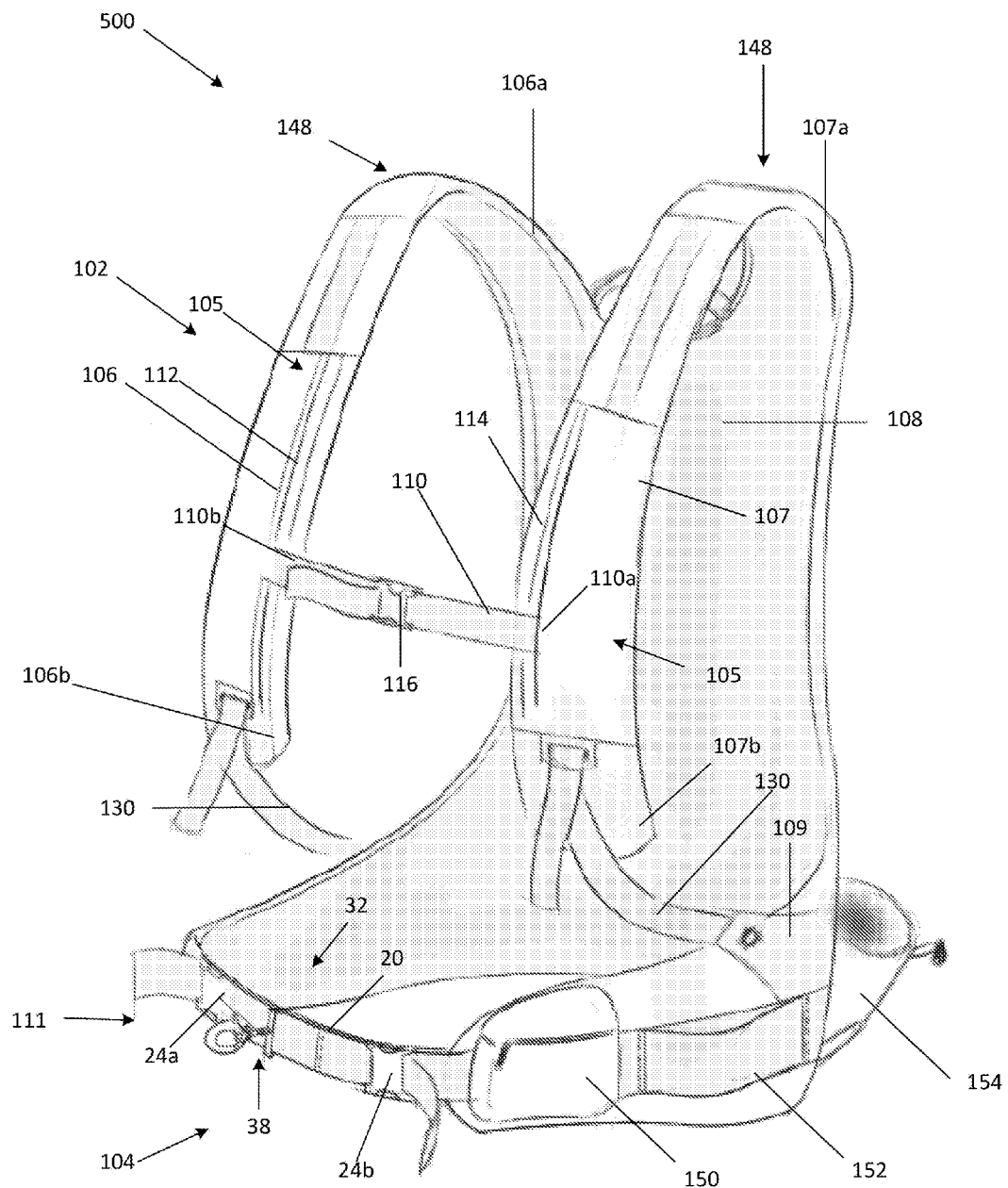
FIG. 5A is a front view of a pack assembly in accordance with an embodiment of the present technology.
Figure 5B:
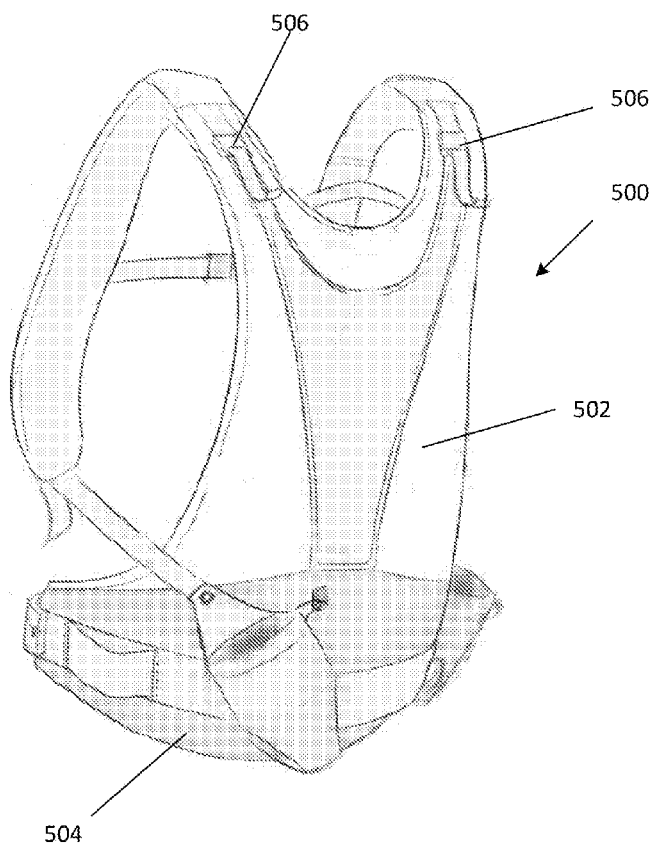
FIG. 5B is a rear perspective view of the pack assembly shown in FIG. 5A.
Figure 5C:
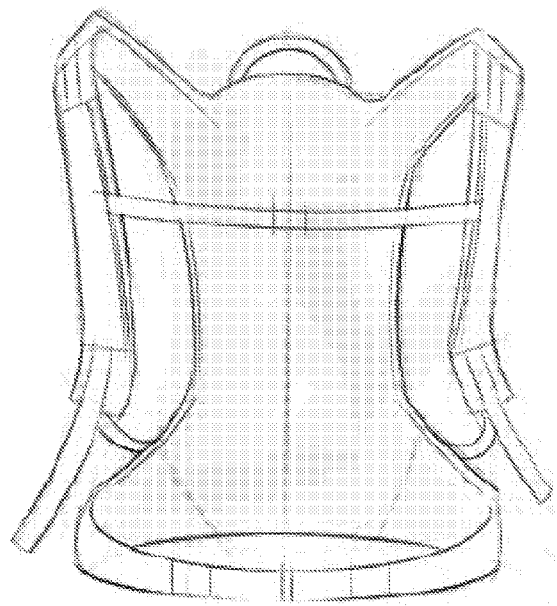
FIG. 5C is a front view of the pack assembly shown in FIG. 5A.

FIGS. 5A-5C show front perspective, rear perspective and front views of another embodiment of a pack assembly 500 configured in accordance with the present technology. The pack 500 and components thereof can be generally similar to those described with reference to FIGS. 1A-4 except as detailed below. Referring to FIGS. 5A-5C together, the rear member 108 can additionally include an underlay 502 (e.g., an air mesh underlay), and the lower portion 104 can include an overlay 504 (e.g., a cordura overlay). Additionally, the rear member 108 can include one or more adjustment members 506 that can be adjusted to change the length of the pack 500.

Figure 6A:
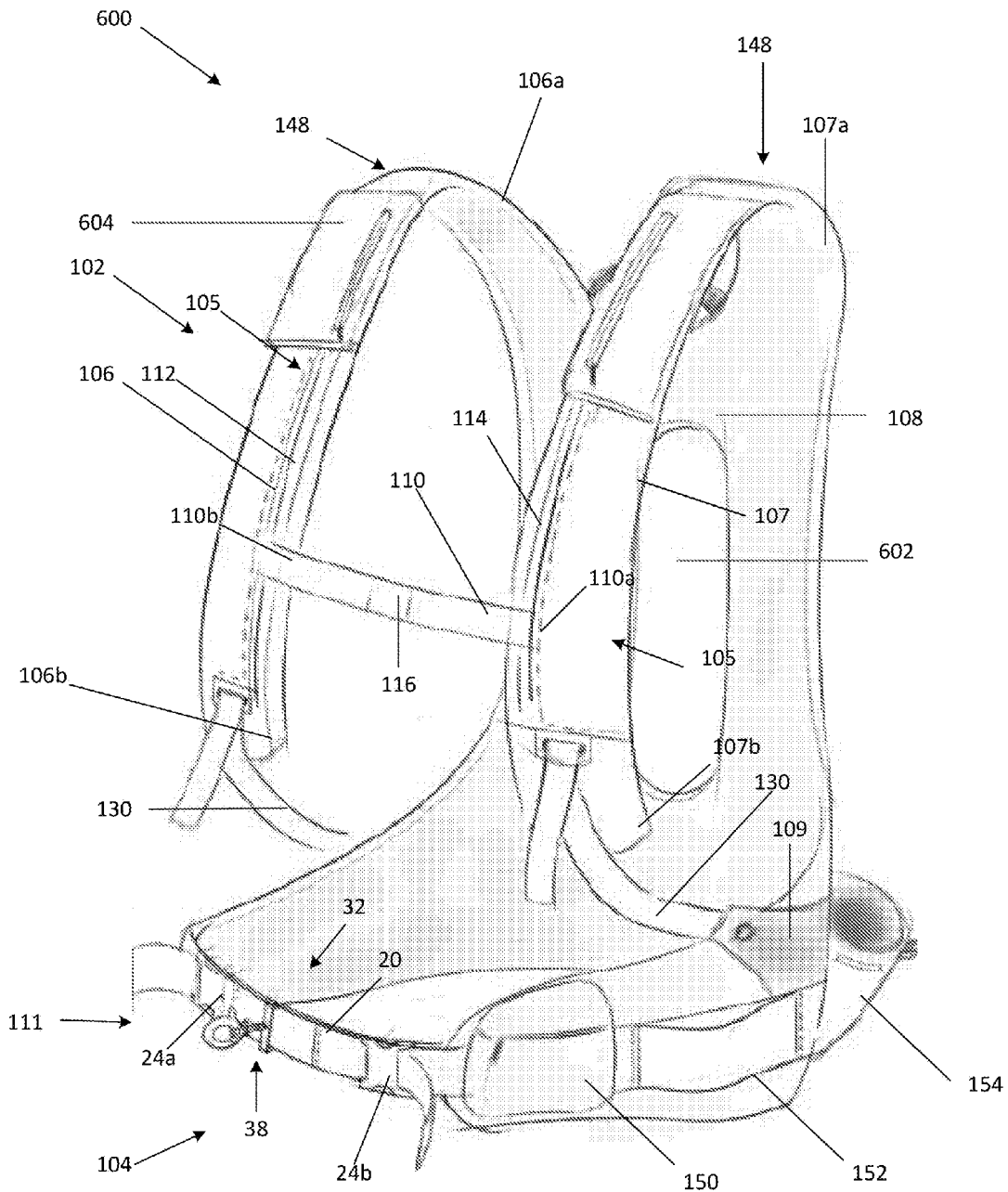
FIG. 6A is a front view of a pack assembly in accordance with an embodiment of the present technology.
Figure 6B:
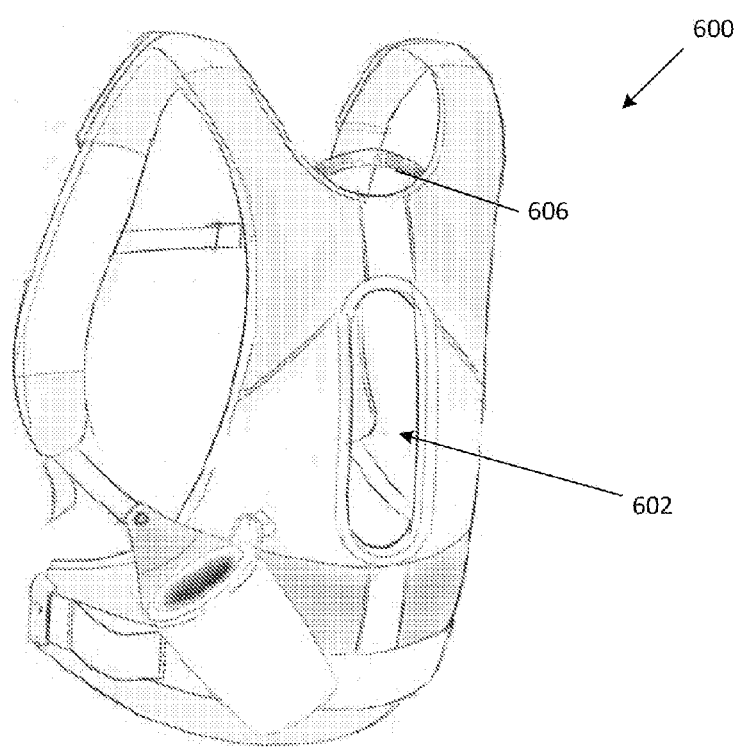
FIG. 6B is a rear perspective view of the pack assembly shown in FIG. 6A.

FIGS. 6A-6B show front perspective and rear perspective views of another embodiment of a pack assembly 600 configured in accordance with the present technology. The pack 600 and components thereof can be generally similar to those described with reference to FIGS. 1A-4 except as detailed below. Referring to FIGS. 6A-6B together, the rear member 108 can include an opening 602 allowing for better ventilation, and one or more of the straps 105 can include one or pockets 604. The pack 600 can further include a locker loop 606.

Figure 7A:
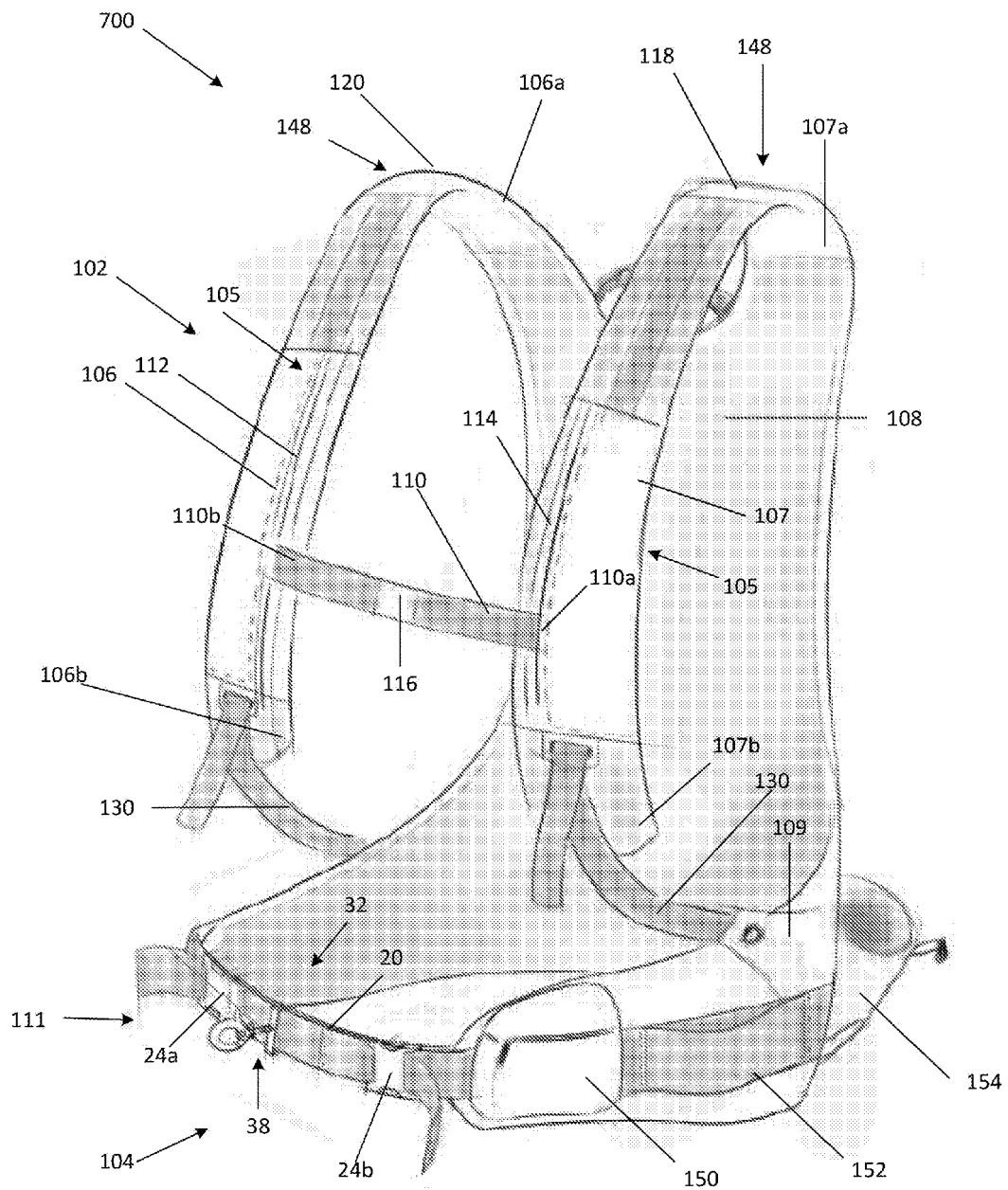
FIG. 7A is a front view of a pack assembly in accordance with an embodiment of the present technology.
Figure 7B:
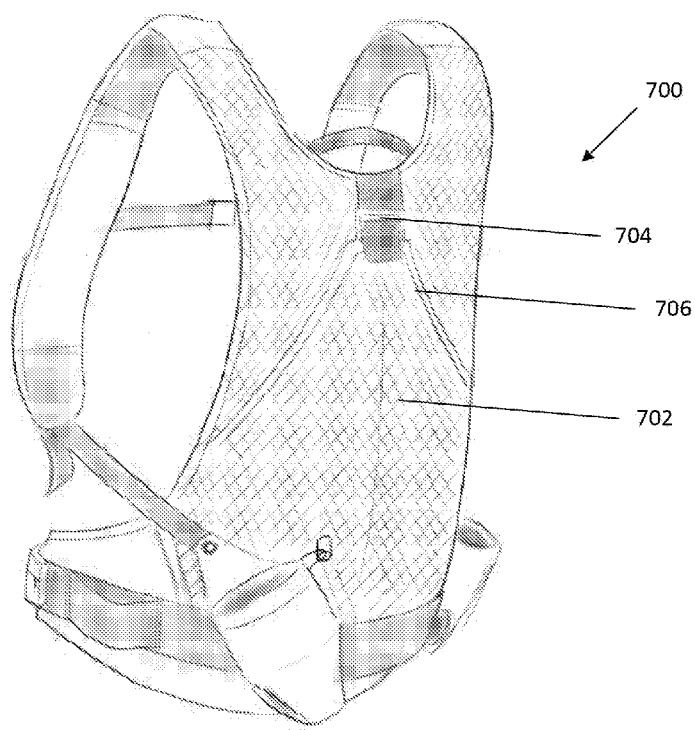
FIG. 7B is a rear perspective view of the pack assembly shown in FIG. 7A.
Figure 7C:
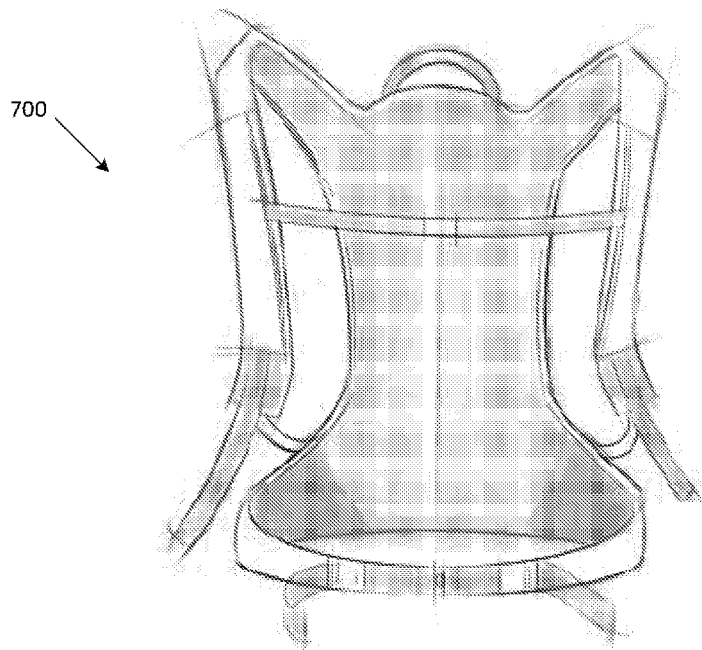
FIG. 7C is a front view of the pack assembly shown in FIG. 7A.

FIGS. 7A-7C show front perspective, rear perspective and front views of another embodiment of a pack assembly 700 configured in accordance with the present technology. The pack 700 and components thereof can be generally similar to those described with reference to FIGS. 1A-4 except as detailed below. Referring to FIGS. 7A-7C together, the exterior surface of the rear member 108 can include an overlay panel 702. The overlay panel 702 can have an adjustment means 704 for adjusting the length of the rear member 108 and/or the overlay panel 702. In some embodiments, the overlay panel 702 can define a pocket 706. In a particular embodiment, the pocket 706 can be configured to carry a hydration bladder.

Figure 8:
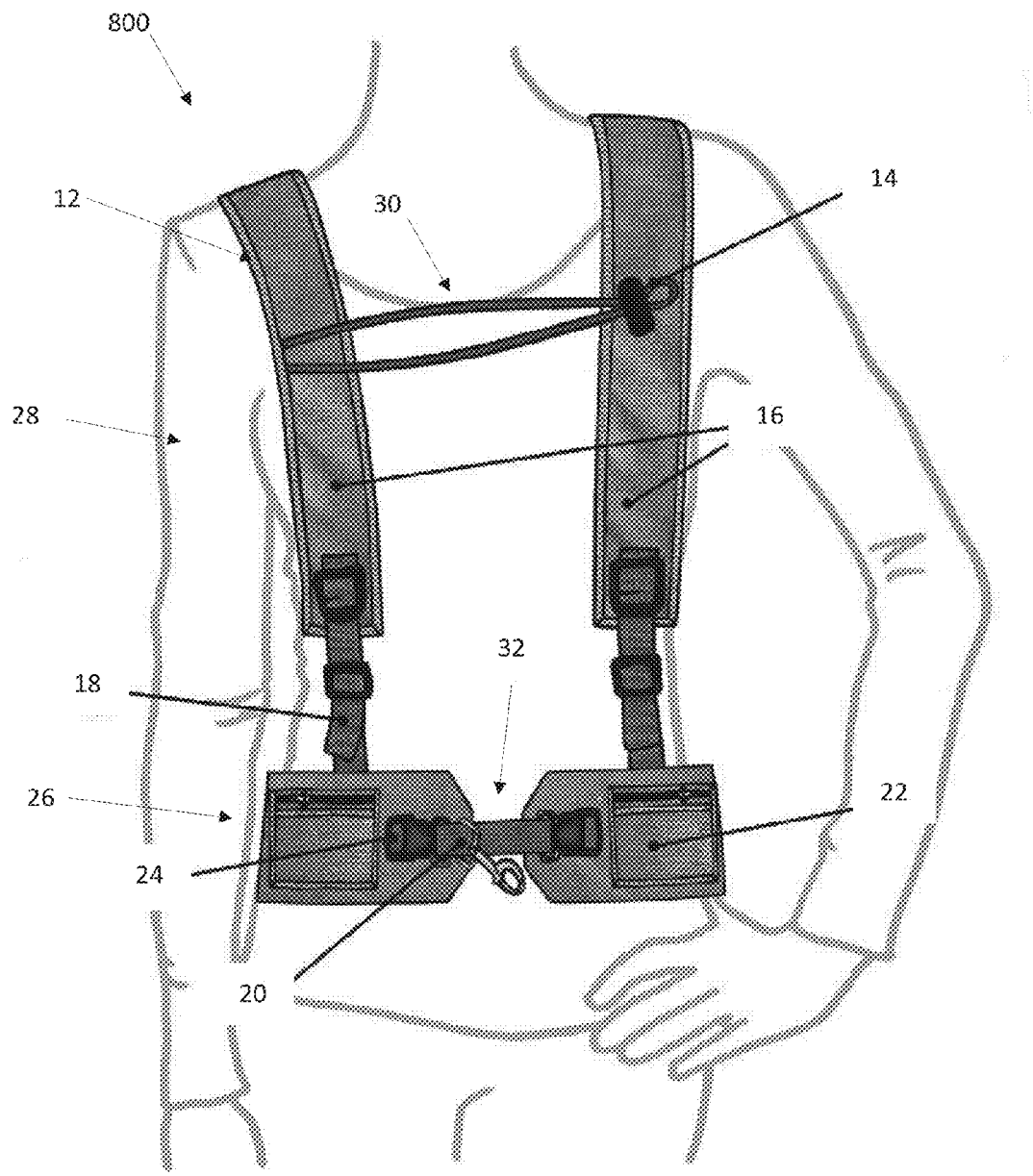
FIG. 8 is a front view of a pack assembly, shown on a wearer, the pack assembly configured in accordance with another embodiment of the present technology.
Figure 9:
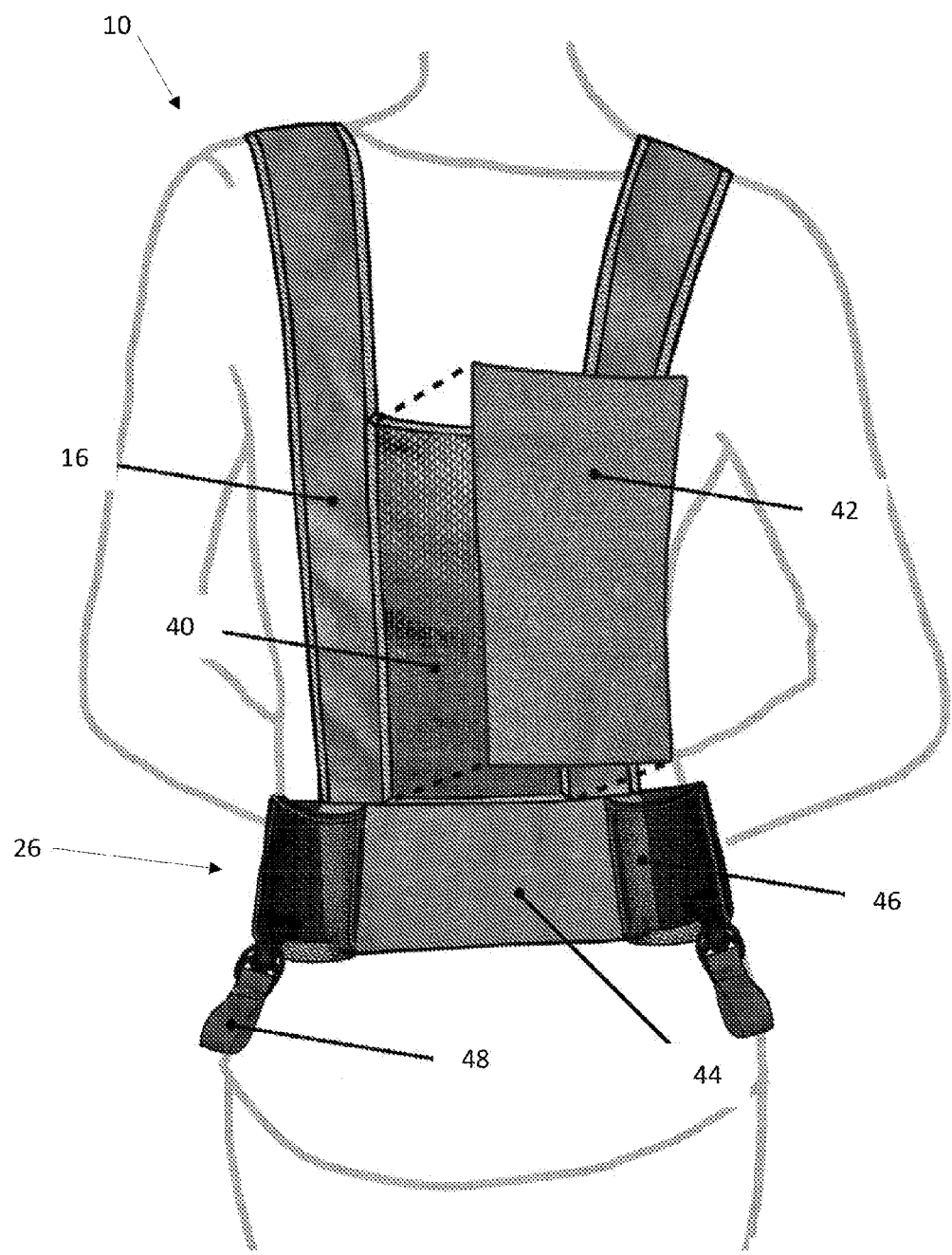
FIG. 9 is a rear view of the pack assembly shown in FIG. 8.
Figure 10:
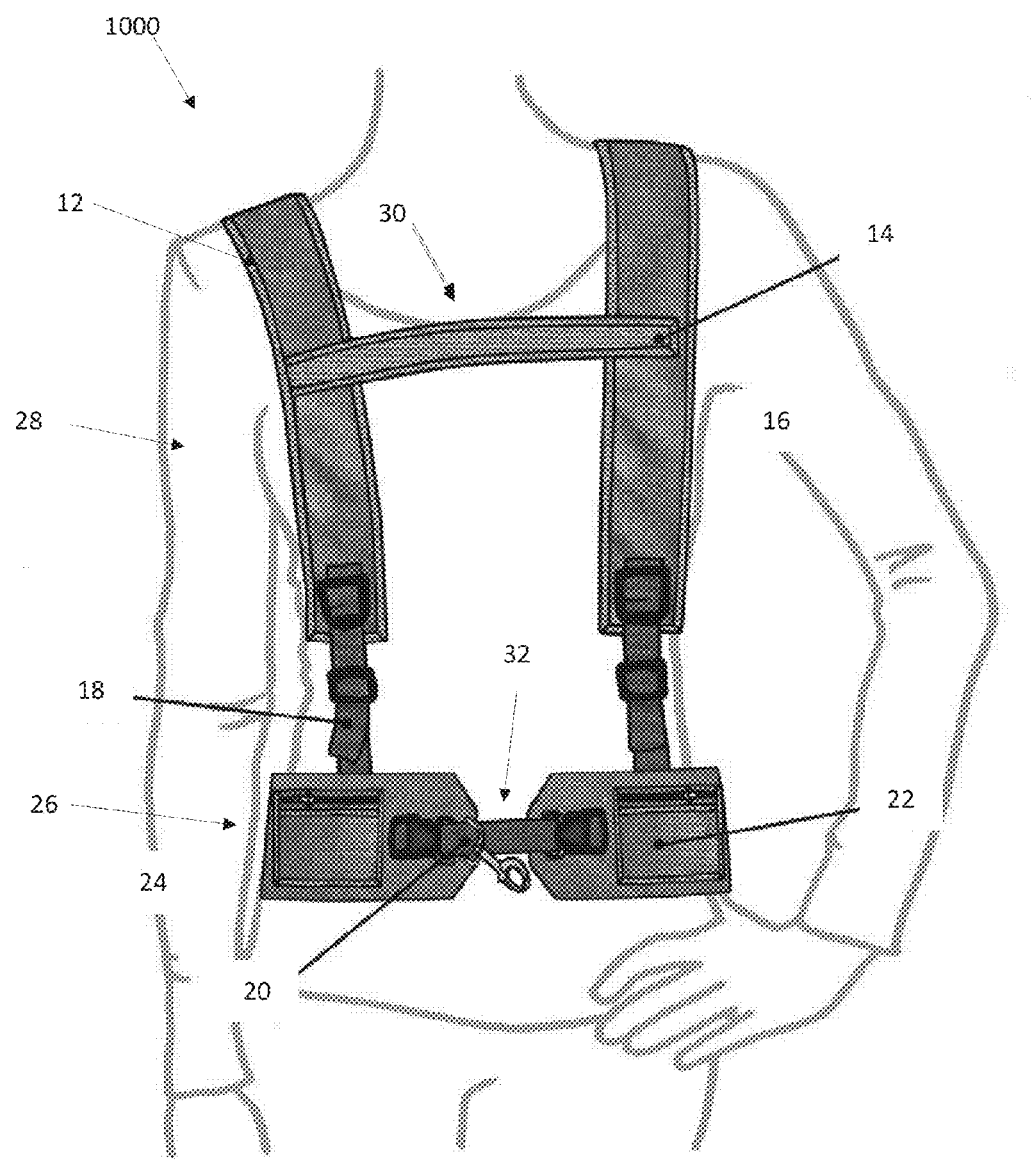
FIG. 10 is a front view of a pack assembly, shown on a wearer, the pack assembly configured in accordance with another embodiment of the present technology.

FIG. 8 is a front view of a pack assembly 800 ("pack 800") configured in accordance with another embodiment of the present technology, and FIG. 9 is a rear view of the pack 800 shown in FIG. 8. The pack 800 can include a chest portion 28 and a belt portion 26. The chest portion 28 can include one or more shoulder straps 16. The shoulder straps 16 can optionally include reflective material 12. The reflective material 12 can be woven and/or sewn into the fabric of the shoulder straps 16. In some embodiments, the reflective material 12 can be detachably connected to the shoulder straps 16, such as by a removable adhesive or Velcro. The entirety of the shoulder straps may be made from a reflective material 16, or in some embodiments, the reflective material 16 may comprise just a periphery of the shoulder straps 16 (as shown in FIG. 8).

The chest portion 28 may optionally include a chest strap 30 that connects the two shoulder straps across an upper chest segment of the pack 10. The chest strap 30 can be made from a stretchable material and have a toggle cinch closure 14 at one end. For example, in some embodiments, the chest strap may comprise a stretchable cord (as show in FIG. 8). In other embodiments, the chest strap can comprise a non-stretchable, solid piece of fabric and/or a stretchable piece of fabric (FIG. 10) that is sewed or otherwise adhered to one shoulder strap 16 and has a Velcro connection at the other shoulder strap 16. The length or tension of the chest strap 30 may be adjusted by a toggle cinch closure 14. For example, adjustment of the chest strap 30 can pull the shoulder straps 16 together and/or release tension between the shoulder straps 16. Additionally, the chest strap 30 can redistribute pulling forces across the chest.

In some embodiments, the belt portion 26 is configured to worn at or near a user's hips. The belt portion can include a leash assembly 32 (described in greater detail with respect to FIG. 2). The belt portion 26 may further include one or more pockets 22. As shown in FIG. 8, the pockets may include a zipper to seal a top and/or side portion of the pocket. In other embodiments, the pockets may be open at a top and/or side portion. The pockets 22 may be any suitable size or shape. For example, in some embodiments, the pockets 22 may be configured to fit a smartphone (not shown). In these and other embodiments, the pockets may be sized to fit a water bottle (not shown), a credit card (not shown), keys (not shown) and other objects that a dog walker may carry during a walk. Furthermore, in some embodiments, the belt portion 26 does not include a pockets 22.

As best shown in FIG. 9, at least a portion of a rear section of the shoulder straps 16 can be connected by a breathable, mesh fabric 40. In some embodiments, the mesh fabric 40 can be covered by an optional reflective material 42. The reflective material 42 can be in addition to or in substitute of the mesh material 40 and may be sewn on, taped on with an adhesive, or detachably coupled to the pack assembly 10 by Velcro. A central rear segment of the belt portion 26 can include a padded material. The padded material, for example, may be made of foam or another suitably padded material. The padded material can be configured to provide support for the user's lower back, especially in response to frontward pulling forces. The belt portion 26 may further include elastic mesh pockets 46 at a rearward side portion. The mesh pockets 46, for example, can be configured to hold a water bottle. The mesh pockets 46 may be closeable via a cinch toggle closure (not shown) that sits atop elastic material. Furthermore, the belt portion 26 can include attachment loops 48. A carabiner, can be clipped to the attachment loops 28 to allow a user to carry additional gear.

Figure 11:
FIG. 11 is a rear view of a pack assembly configured in accordance with another embodiment of the present technology.

FIG. 11 is a rear view of a pack assembly 10 configured in accordance with another embodiment of the present technology. FIG. 11 shows that one or more sections of the belt portion 26 can include an elastic material 48. The elastic material 48 allows the belt portion 26 to stretch and conform to a particular user, as well as gently distribute pulling forces. Although in the embodiment shown the elastic material 48 is positioned at the side sections of the belt portion 26, in other embodiments the elastic material can comprise the entire belt portion 26. In yet other embodiments, the belt portion can include more than two elastic material sections 48, and in some embodiments, the belt portion can have one elastic material section 48.

Moreover, in certain embodiments having elastic material 48 on the sides of the belt portion 26, the slider 20 does not sit on a user's waist like a normal belt since the elastic material 48 conforms to the waist. In other words, the slider 20 does not put pressure on the abdominal section of a user.

Figure 12:
FIG. 12 is a rear view of a pack assembly configured in accordance with another embodiment of the present technology.

FIG. 12 shows that a back segment of the belt portion 26 may optionally include a water bottle holder.

Figure 13:
FIG. 13 is a front view of a jacket assembly configured in accordance with the present technology.
Figure 14:
FIG. 14 is a front view of a jacket assembly having pockets configured in accordance with the present technology.
Figure 15:
FIG. 15 is a front view of a sleeveless jacket assembly configured in accordance with the present technology.
Figure 16:
FIG. 16 is a front view of a sleeveless jacket assembly having pockets configured in accordance with the present technology.

FIG. 13 is a front view of a jacket assembly 1300 configured in accordance with one or more embodiments of the present technology. As shown, the jacket assembly 1300 can be full-sleeved and have a zipper up the front. The jacket assembly 1300 may optionally include side pockets (FIG. 14). The jacket assembly 1300 may include a leash assembly as described with respect to FIGS. 1A-4. As shown in FIG. 15, the assembly may optionally be a sleeveless assembly 1500 without pockets, or in some embodiments, the sleeveless jacket assembly 1500 may include pockets (FIG. 16). Furthermore, the jacket assembly 1300 and/or sleeveless jacket assembly 1500 may be made of a mesh material.

The above detailed descriptions of embodiments of the technology are not intended to be exhaustive or to limit the technology to the precise form disclosed above. Although specific embodiments of, and examples for, the technology are described above for illustrative purposes, various equivalent modifications are possible within the scope of the technology, as those skilled in the relevant art will recognize. For example, while steps are presented in a given order, alternative embodiments may perform steps in a different order. The various embodiments described herein may also be combined to provide further embodiments.

From the foregoing, it will be appreciated that specific embodiments of the technology have been described herein for purposes of illustration, but well-known structures and functions have not been shown or described in detail to avoid unnecessarily obscuring the description of the embodiments of the technology. Where the context permits, singular or plural terms may also include the plural or singular term, respectively.

Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the term "comprising" is used throughout to mean including at least the recited feature(s) such that any greater number of the same feature and/or additional types of other features are not precluded. It will also be appreciated that specific embodiments have been described herein for purposes of illustration, but that various modifications may be made without deviating from the technology. Further, while advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

I claim:

1. A pack assembly, comprising:
    an upper portion, including—
        a first strap;
        a second strap;
        a rear member coupled to the first strap and the second strap;
    a lower portion having a front portion, a rear portion, and first and second side portions, wherein the front portion is coupled to the first and second straps and the rear portion is coupled to the rear member, wherein the front portion further includes a leash assembly, the leash assembly having—
        a first coupling coupled the lower portion at a first location along a length of the lower portion;
        a second coupling coupled to the lower portion at a second location along the length of the lower portion, wherein the second location is different than the first location;
        a guide extending between the first coupling and the second coupling; and
        a slider coupled to the guide and configured to slide laterally along the length of the guide, wherein the slider includes a locking portion configured to be coupled to a leash,
        wherein the guide is made of an elastic material such that the guide can stretch and contract in response to a force exerted on the slider.

2. The pack assembly of claim 1 wherein the guide is comprised of a plurality of layers, and wherein the slider is coupled to only some of the plurality of layers.

3. The pack assembly of claim 1 wherein the guide is comprised of a first layer and a second layer, and wherein the slider is slidably coupled to the first layer and not the second layer.

4. The pack assembly of claim 1 wherein the slider includes a slider portion configured to slide laterally along the guide, and wherein the slider portion is coupled to the locking portion.

5. The pack assembly of claim 1 wherein the slider includes a slider portion configured to be positioned around the guide, and wherein the slider portion is coupled to the locking portion.

6. The pack assembly of claim 1 wherein the guide is configured to absorb a force exerted on the pack assembly.

7. The pack assembly of claim 1 wherein the guide is configured to detach from the lower portion at at least one of the first coupling and the second coupling.

8. The pack assembly of claim 1 wherein the side portions include a first side portion and second side portion, and wherein:
the first coupling is configured to be detachably coupled to the first side portion;
the second coupling is configured to be detachably coupled to the second side portion; and
when worn by a wearer, the guide is positioned at a front portion of the wearer's body.

9. The pack assembly of claim 1 wherein the first strap and the second strap are individually configured to be positioned on a shoulder of a wearer.

10. The pack assembly of claim 1 wherein the first strap and the second strap individually have a bent shape.

11. The pack assembly of claim 1 wherein the lower portion is configured to be positioned at a waist of a wearer.

12. A leash assembly for coupling to a pack, the pack including an upper portion and a lower portion, the leash assembly comprising:
a first coupling coupled the lower portion at a first location along a length of the lower portion;
a second coupling coupled to the lower portion at a second location along the length of the lower portion, wherein the second location is different than the first location;
wherein the first and second couplings are configured to individually couple the leash assembly to the lower portion;
a guide extending between the first coupling and the second coupling; and
a slider coupled to the guide and configured to slide laterally along the length of the guide, wherein the slider includes a locking portion configured to be coupled to a leash,
wherein the guide is made of an elastic material such that the guide can stretch and contract in response to a force exerted on the slider.

13. The leash assembly of claim 12 wherein the guide is comprised of a plurality of layers, and wherein the slider is coupled to only some of the plurality of layers.

14. The leash assembly of claim 12 wherein the guide is comprised of a first layer and a second layer, and wherein the slider is slidably coupled to the first layer and not the second layer.

15. The leash assembly of claim 12 wherein the slider includes a slider portion configured to slide laterally along the guide, and wherein the slider portion is coupled to the locking portion.

16. The leash assembly of claim 12 wherein the slider includes a slider portion configured to be positioned around the guide, and wherein the slider portion is coupled to the locking portion.

17. The leash assembly of claim 12 wherein the guide is configured to absorb a force exerted on the leash assembly.

18. The leash assembly of claim 12 wherein at least one of the first coupling and the second coupling are configured to couple with a pack assembly.

* * * * *